United States Patent
Campbell

(10) Patent No.: US 11,689,623 B2
(45) Date of Patent: *Jun. 27, 2023

(54) ADAPTIVE REAL-TIME STREAMING FOR AUTONOMOUS VEHICLES

(71) Applicant: GM Cruise Holdings LLC, San Francisco, CA (US)

(72) Inventor: Caitlin Campbell, Kent, WA (US)

(73) Assignee: GM Cruise Holdings LLC, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/698,514

(22) Filed: Mar. 18, 2022

(65) Prior Publication Data
US 2022/0210228 A1  Jun. 30, 2022

Related U.S. Application Data

(63) Continuation of application No. 16/458,179, filed on Jun. 30, 2019, now Pat. No. 11,316,928.

(51) Int. Cl.
| | |
|---|---|
| *H04L 67/125* | (2022.01) |
| *H04L 65/752* | (2022.01) |
| *H04L 67/12* | (2022.01) |
| *B60W 50/00* | (2006.01) |
| *G05D 1/02* | (2020.01) |
| *G07C 5/00* | (2006.01) |
| *H04L 65/61* | (2022.01) |

(52) U.S. Cl.
CPC ......... *H04L 67/125* (2013.01); *G05D 1/0221* (2013.01); *G07C 5/008* (2013.01); *H04L 65/61* (2022.05); *B60W 50/00* (2013.01)

(58) Field of Classification Search
CPC ..... H04L 67/125; H04L 65/752; H04L 67/12; B60W 50/00
See application file for complete search history.

(56) References Cited

U.S. PATENT DOCUMENTS

| | | |
|---|---|---|
| 2019/0300017 A1 | 10/2019 | Glaser et al. |
| 2020/0322663 A1* | 10/2020 | Vaderna ............... H04L 47/263 |
| 2021/0096581 A1 | 4/2021 | Simpson et al. |
| 2021/0192867 A1 | 6/2021 | Fang et al. |
| 2022/0046228 A1* | 2/2022 | Haskin ................ H04N 17/004 |

* cited by examiner

*Primary Examiner* — Shirley X Zhang
(74) *Attorney, Agent, or Firm* — Novak Druce Carroll LLP

(57) ABSTRACT

Systems and methods provide for adaptive real-time streaming of Autonomous Vehicle (AV) data. In some embodiments, the AV can receive a request from the remote computing system for real-time streaming of a first type of AV data and adaptively streaming a second type of AV data when one or more streaming conditions are satisfied. The first type of AV data and the second type of AV data can be captured as raw data by sensors, actuators, transducers, and other components of the AV. The AV can stream the first type of AV data to the remote computing system in real-time for a first time period. When the AV determines the streaming conditions are satisfied, the AV can automatically determine the second type of AV data to stream to the remote computing system in real-time for a second time period.

20 Claims, 5 Drawing Sheets

ADAPTIVE REAL-TIME STREAMING FOR AUTONOMOUS VEHICLES

CROSS-REFERENCE TO RELATED APPLICATIONS

This application is a continuation of U.S. application Ser. No. 16/458,179, filed on Jun. 30, 2019, entitled, ADAPTIVE REAL-TIME STREAMING FOR AUTONOMOUS VEHICLES, which is hereby expressly incorporated by reference in its entirety and for all purposes.

TECHNICAL FIELD

The subject matter of this disclosure relates in general to the field of autonomous vehicles, and more particularly, to systems and methods for adaptive real-time streaming of autonomous vehicle data.

BACKGROUND

An autonomous vehicle (AV) is a motorized vehicle that can navigate without a human driver. The AV can include a plurality of sensor systems, such as a camera sensor system, a Light Detection and Ranging (LIDAR) sensor system, and a Radio Detection and Ranging (RADAR) sensor system, among others. The AV may operate based upon sensor signals output by the sensor systems. For example, the sensor signals can be provided to a local computing system in communication with the plurality of sensor systems and a processor can execute instructions based upon the sensor signals to control one or more mechanical systems of the AV, such as a vehicle propulsion system, a braking system, a steering system, and so forth.

In addition to sensor data for controlling the vehicle, the AV can collect various other types of data, such as battery or fuel consumption data, navigational data (e.g., geographical coordinates, routes, mapping data, etc.), traffic conditions, road conditions, weather conditions, and other data relating to the AV or its environment. If the AV is part of a ridesharing service, the AV can also collect passenger data (e.g., demographic data, passenger behavior data, etc.), trip data (e.g., pick-up and drop-off locations, fare, trip rating, etc.), client device data, and so forth. The AV can process some of its data "on-line" or in real-time or near real-time for immediate maneuvering of the vehicle. It can also be advantageous to stream the AV data to a remote computing system (e.g., a data center) in real-time or near real-time to safely and efficiently operate the AV. However, different contexts or circumstances can affect streaming of AV data, such as the available bandwidth of the communication channel between the AV and the remote computing system, network congestion, the location of the AV relative to network infrastructure (e.g., cell towers, access points, etc.), Radio Frequency (RF) interference, low battery level for maintaining a signal, and the like.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Figure 1:
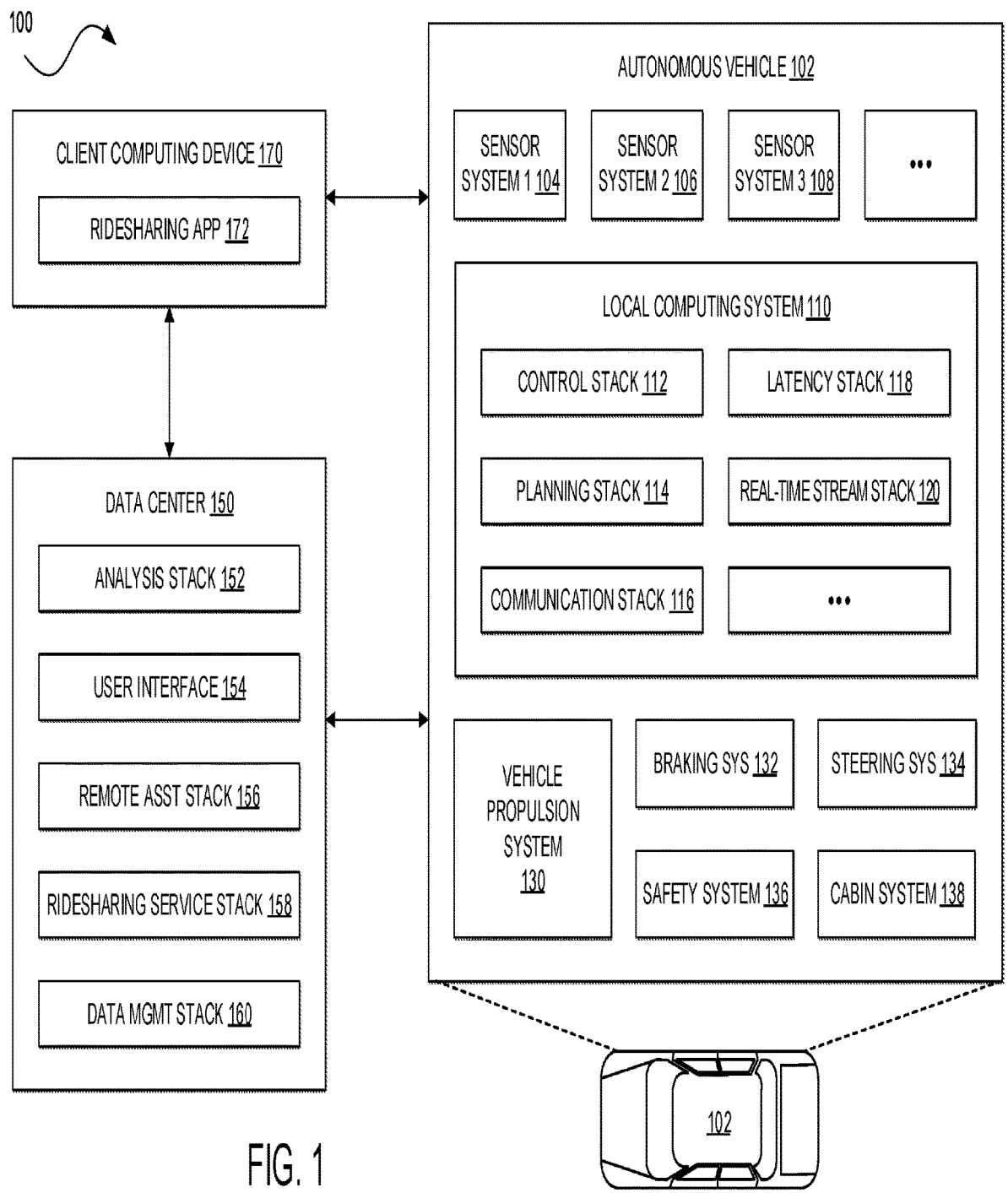
FIG. 1 illustrates an example of a system for managing one or more Autonomous Vehicles (AVs) in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

The present technology can involve the gathering and use of data available from various sources to improve quality and experience. The present disclosure contemplates that in some instances, this gathered data may include personal information. The present disclosure contemplates that the entities involved with such personal information respect and value privacy policies and practices.

An Autonomous Vehicle (AV) can capture various different types of data from different instruments during the course of operation that can be helpful to stream in real-time to a remote computing system for the safe and efficient management of the AV and AV-related services. For example, the AV may transmit its current location and route to the remote computing system in order to receive the latest road conditions, traffic conditions, road closures, weather conditions, and the like so that the AV can optimize navigation. Alternatively or in addition, the AV can provide similar information to the remote computing system or other vehicles in real-time or near real-time to facilitate efficient routing of the other vehicles. The AV can also provide other time-sensitive services requiring it to stream its data, such as displaying contextual advertising, reporting on expiring street meters or other traffic infractions, notifying other drivers of available parking spaces, and so forth.

As another example, if the AV provides a ridesharing or delivery service, it may be critical to stream certain types of AV data or AV data from different instruments, such as its current location and route, fuel or battery state, occupancy information, and the like, to schedule and dispatch the AV to customers. If the AV is part of an AV fleet, the AV data can be helpful to optimize the distribution and utilization of the fleet. The AV can also provide other ridesharing or delivery service features, such as multi-passenger coordination, guiding customers to pick-up locations or from drop-off locations to their ultimate destinations, monitoring customers to ensure they safely enter destination buildings, and so on.

As yet another example, if the AV has been involved in a collision or detects that a nearby accident has occurred, it can be beneficial to determine how to best respond to the circumstances by receiving additional contextual information relating to the AV or its immediate environment. This additional contextual information may include audio or video captured at the scene, location or navigation data, Event Data Recorder (EDR) data (e.g., forward and lateral crash force, crash event duration, vehicle speed, accelerator position, engine revolutions per minute (rpm), brake application and antilock brake activation, steering wheel angle, stability control engagement, vehicle roll angle (in case of a rollover), number of times the vehicle has been started, driver and front-passenger safety belt engagement, pretensioner or force limiter engagement, airbag deployment, airbag speed, airbag faults, seat occupancy positions, occupant sizes, number of crashes (one or more impacts during the final crash event), etc.), and the like.

A conventional approach for real-time streaming of data is Hypertext Transfer Protocol (HTTP) real-time streaming (e.g., Motion Picture Experts Group Dynamic Adaptive Streaming over Hypertext Transfer Protocol (MPEG-DASH), Apple® HTTP Live Streaming (HLS), Adobe® Dynamic Streaming, Microsoft® Smooth Streaming, etc.). Here, real-time or near real-time streaming can refer to capturing data from an analog source (i.e., the real world) and digitizing output in a manner with little to no human-observable delay. Conventional HTTP real-time streaming enables transmission of audio and video captured by a video camera over HTTP from a web server for playback on client devices, and provides mechanisms for the client devices to adjust to limited network bandwidth without causing user-visible playback stalling. For example, on an unreliable wireless network, conventional HTTP real-time streaming can allow client devices to request lower quality audio or video, thus reducing bandwidth utilization.

To enable client devices to compensate for bandwidth limitations, conventional HTTP real-time streaming audio or video can be encoded in several distinct quality levels with each different bitrate stream segmented into smaller parts (e.g., 2 to 10 second clips). Conventional HTTP real-time streaming servers can provide a master index or manifest of these separate encodings, and client devices can select between the different bitrate streams during playback and change back and forth as network conditions change.

There are a number of differences between conventional HTTP real-time streaming and streaming of AV data that make the former unsuitable for the latter. The AV operates as the server for real-time streaming of AV data but the AV typically has limited computing resources (e.g., processing, memory, storage, etc.) relative to conventional HTTP real-time streaming servers, which are typically deployed in large enterprise or cloud computing networks and effectively have limitless computing resources. For example, there is only so much hardware the AV can accommodate but the cloud computing network has no such bounds. Processes for mechanically controlling the AV safely have priority over streaming AV data for these finite computing resources, unlike conventional HTTP real-time streaming servers whose dedicated purpose is to stream audio and video. The AV's relatively limited storage capacity can also be a significant constraint for real-time streaming of AV data but not for conventional HTTP real-time streaming. For example, the AV needs the ability to free up storage to continue capturing data or suffer data loss.

Another contrast between conventional HTTP real-time streaming and real-time streaming of AV data is the type of data and the instruments used to capture raw data (e.g., analog data or digital data processed and output in real-time). Conventional HTTP real-time streaming serves the same type of data (i.e., audio and video) captured by one instrument (i.e., a video camera). In addition to audio and video, AV data can also include Inertial Measuring Unit (IMU) data (e.g., accelerometry, gyroscope data, magnetometry, etc.), LIDAR data, Global Positioning System (GPS) data, RADAR data, ultrasonic sensor data, electric engine sensor data (e.g., temperature sensor, voltage sensor, current sensor, etc.), internal combustion engine sensor data (e.g., coolant temperature sensor data, mass air flow sensor data, engine speed sensor data, oxygen sensor data, manifold absolute pressure sensor data, etc.), speedometry, tachometry, odometry, airbag sensor data, collision sensor data, seat occupancy sensor data, and the like.

Further, consumers of real-time AV data can have many different purposes depending on the AV's context. For example, a ridesharing or delivery service may need real-time navigational data, a remote assistance service may need real-time EDR data, or a maintenance team may need real-time mechanical diagnostic data. In addition, certain AV data may be more critical than others at different times but conventional HTTP real-time streaming does not implement prioritization, differential service, and the like.

Various embodiments of the present disclosure can address the above and other challenges of streaming AV data. In particular, an adaptive real-time streaming data platform can be provided to automate the type of data an AV can stream to a remote computing system under different contexts. Here, automate can refer to the AV acting without direct human intervention, such as a user pushing a physical or virtual button or immediately passing a command. This can improve the ability of the AV to adapt to changes to its state or the state of its environment. The type of AV data can change dynamically in an expected manner within the same data stream, and without a break in the stream (e.g., having to create a new HTTP or other network connection). This can decrease the number of false positive alerts of non-nominal behavior of the AV, and thereby increase the reliability of the AV and AV-related services. In addition, when network conditions or other factors that may have an effect on streaming improve, the platform can support backfilling of adapted AV data with the original type of AV data requested. These conditions can be configured before runtime or before streaming begins.

In some embodiments, an AV can receive a request from a remote computing system (e.g., private data center, a public cloud computing network, another AV, or other computing system authorized to access the AV data) for real-time streaming of a first type of AV data and adaptively streaming a second type of AV data when or more streaming conditions are satisfied. The first type of AV data can comprise the data of the sensors, transducers, actuators, and other components of the AV. The first type of AV data can comprise data from a single sensor, transducer, actuator, or other component, or a system of these components. In some embodiments, the second type of AV data can comprise data from one or more different components or systems of the AV. Alternatively or in addition, the second type of AV data can correspond to different raw AV data captured by the same component or system of the AV.

When the one or more streaming conditions are satisfied, the AV can, without direct human intervention, determine the second type of AV data and stream it in real-time to the remote computing system for a second time period. In some embodiments, the second type of AV data can stream in the same real-time stream utilized for streaming the first type of data. The streaming conditions may be based on a state of a computing resource of the AV (e.g., processing, memory, storage, network bandwidth, etc.) or the remote computing system, a geographic location of the AV, a mechanical state of the AV, a battery state of the AV, a state of an AV instrument, whether the AV is occupied by a passenger or delivery item, a state of a trip (e.g., en-route to pick-up or drop-off), or a state of a physical environment of the AV (e.g., road traffic conditions, weather, time of day, etc.).

For example, the AV can transmit LIDAR data from a first set of LIDARs within a real-time stream by default but stream LIDAR data in the same stream from a second set of "tinted" LIDAR sensors under especially bright sunlight conditions. In addition, the AV can also adapt other attributes of the LIDAR data mid-stream, such as a LIDAR data format (e.g., LIDAR Data Exchange File (LAS), LAS compressed (LAZ), ZLAS, E57, etc.), LIDAR data encoding, encoding (e.g., American Standard Code for Information Interchange (ASCII), binary), point cloud format (e.g., Point Data Record type 0, type, 1, type 2, etc., and version), set of point attributes (e.g., X, Y, Z values, intensity of pulse return, return identification, classification, scan angle, source identifier, etc.), point attribute format (e.g., integer, float, etc.), GPS format, color data, wave packet data, infrared data, point density, sampling rate, coordinate system (e.g., Cartesian, spherical, horizontal, vertical, etc.), spatial dimensionality (e.g., 2-dimensional, 3-dimensional), set of boundaries (e.g., tiles, point cloud size, etc.), or compression algorithm (e.g., lossy versus lossless, progress versus non-progressive (or single-rate), streaming versus non-streaming, point-permuting versus order-preserving, sequential versus random access, etc.), among numerous other attributes.

The AV can also adapt the AV data to stream from entirely different types of instruments. For example, the AV can transmit video from a Charge-Coupled Device (CCD) camera in a real-time stream under normal network conditions but transmit LIDAR data in the real-time stream when network conditions are poor. The adapted data can be in their native formats in some embodiments, such as Motion Picture Experts Group (MPEG) 4 for video and LAZ for the LIDAR data. In other embodiments, the adapted data can be in the format of the originally requested AV data. For instance, the AV may encode the LIDAR data in MPEG-4 format if the circumstances dictate it. In another example, the AV may chain a set of different AV instruments each of whose data the AV may alternatively transmit in a real-time stream for diagnostic or calibration purposes, such as GPS data in a first state, LIDAR data in a second state, RADAR data in a third state, accelerometry in a fourth state, odometry in a fifth state, and so on. This is sometimes referred to as a chain-of-responsibility pattern.

In addition, the AV can adapt AV data by aggregating AV data captured by multiple types of instruments (e.g., sensor fusion). Other aggregations are also possible. For example, the AV may utilize a stream processing pipeline represented by a Directed Acyclic Graph (DAG). In a first context, the AV can process raw AV data through a first path of a first DAG to generate the first type of AV data for transmission in a real-time stream. In a second context, the AV can process the raw AV data or the first type of AV data through a second DAG or a second path of the first DAG to generate the adapted AV data for transmission in the real-time of representing the second processing information to generate the adapted AV data. Each node of the DAGs can comprise different sets of operations performed on AV data, and the first DAG and second DAG can share zero or more nodes. Processing can occur in parallel or sequentially depending on their respective paths. Other embodiments may deploy other design patterns, such as abstract factory, dependency injection, state machine, strategy, visitor, and so forth.

In some embodiments, the AV can also adapt how it streams AV data, such as by adjusting bitrate or baud rate, prioritizing certain AV data over another, using different and/or multiple physical media (e.g., wired or wireless) or data links, and other protocols up and down the Open System Interconnect (OSI) model. For example, in some embodiments, the AV can stream data over Layer 7 using a single connection with one or multiple channels, multiple connections, uni-directionally or bi-directionally, and so forth. Numerous other functions and advantages are described and suggested below in accordance with the various embodiments.

Turning now to the drawings, FIG. 1 illustrates an example of a system for an AV system 100. One of ordinary skill in the art will understand that, for the AV system 100 and any system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the AV system 100 includes an AV 102, a data center 150, and a client computing device 170. The AV 102, the data center 150, and the client computing device 170 can communicate with each other over one or more networks, such as a public network (e.g., a public cloud, the Internet, etc.), a private network (e.g., a local area network, a private cloud, a virtual private network, etc.), and/or a hybrid network (e.g., a multi-cloud or hybrid cloud network, etc.).

The AV 102 can navigate about roadways without a human driver based on sensor signals generated by multiple sensor systems 104, 106, and 108. The sensor systems 104-108 can include different types of sensors and can be arranged about the AV 102. For instance, the sensor systems 104-108 can comprise IMUs, image sensors (e.g., still image cameras, video cameras, etc.), light sensors (e.g., LIDAR systems, ambient light sensors, infrared sensors, etc.), GPS receivers, RADAR systems, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. In this example, the sensor system 104 can be a RADAR system, the sensor system 106 can be a first image sensor system (e.g., still image or video cameras), and the sensor system 108 can be a second image sensor system (e.g., LIDAR system). Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 may not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing system 110 that is in communication with the sensor systems 104-108, the mechanical systems 130-138, the data center 150, and the client computing device 170, among other systems. The local computing system 110 can include one or more processors and memory including instructions that can be executed by the one or more processors. The instructions can make up one or more software stacks or systems responsible for controlling the AV 102, communicating with the data center 150, the client computing device 170, and other systems, receiving inputs from users, logging metrics collected by the sensor systems 104-108 and users, and so forth. In this example, the local computing system 110 includes a control stack 112, a planning stack 114, a communication stack 116, a latency stack 118, and a real-time streaming stack 120, among other stacks and systems.

The control stack 112 can manage the operation of the vehicle propulsion system 130, the braking system 132, the steering system 134, the safety system 136, and the cabin system 138. The control stack 112 can receive sensor signals from the sensor systems 104-108 as well as communicate with other stacks of the local computing system 110 to effectuate operation of the AV 102. In some embodiments, the control stack 112 may carry out operations in concert with one or more other stacks or systems of the AV 102.

The planning stack 114 can determine how to maneuver or operate the AV 102 safely in its environment. For example, the planning stack 114 can be provided with the location, speed, and direction of the AV 102, map or route information, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another. The planning stack 114 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 114 can select from multiple backup plans to carry out. For example, while preparing to change lanes to turn right at an intersection, another vehicle may aggressively cut into the destination lane, making the lane change unsafe. The planning stack 114 would have already determined an alternative plan for such an event, and upon the event occurring, help to direct the AV 102 to go around the block instead of blocking its current lane while waiting for an opening to change lanes. In some embodiments, the planning stack 114 can be a part of the control stack 112.

The communication stack 116 can transmit and receive signals between the stacks and systems of the AV 102 and between the AV 102, the data center 150, the client computing device 170, and other remote systems. The communication stack 116 can enable the local computing system 110 to exchange information remotely over a network, such as through an antenna array or interface that can provide municipal Wi-Fi, cellular (e.g., Third Generation (3G), Fourth Generation (4G), Long-Term Evolution (LTE), 5th Generation (5G), etc.), or other wireless Wide Area Network (WAN) or remote connection. The communication stack 116 can also facilitate local exchange of information, such as through a wired connection (e.g., a user's mobile computing device docked in an in-car docking station or connected via Universal Serial Bus (USB), the local computing system 110, etc.) or a local wireless connection (e.g., Wireless Local Area Network (WLAN), Bluetooth®, infrared, etc.).

The latency stack 118 can utilize timestamps on communications to and from the data center 150 to determine if a communication has been received from the data center 150 in time to be useful. For example, when a stack of the local computing system 110 requests feedback from the data center 150 on a time-sensitive basis, the latency stack 118 can determine if a response was timely received from the data center 150 as information can quickly become too stale to be actionable. When the latency stack 118 determines that a response has not been received within a threshold, the latency stack 118 can enable other stacks or systems of the AV 102 or a user to make necessary decisions or to provide the needed feedback.

The real-time streaming stack 120 can dynamically adapt the type of AV data the AV 102 can stream depending on the AV's context (e.g., a current state of the AV or its environment). For example, when the AV's computing resources, such as processing capacity or network bandwidth become limited, the real-time streaming stack 120 can substitute one type of AV data for another or the AV data of one instrument for another. The real-time streaming stack 120 can also prioritize certain streaming AV data under different contexts, such as prioritizing streaming battery power information when the AV is in a low battery state, audio or video during emergency situations, navigation data during times of traffic congestion, and so forth.

The data center 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 150 can include one or more computing systems remote to the local computing system 110 for managing a fleet of AVs and AV-related services. In some embodiments, the data center 150 can support a ridesharing service, a delivery service, a remote/roadside assistance service, street services (e.g., street view, street patrol, street cleaning, street metering, parking reservation, etc.), and the like.

The data center 150 can send and receive various signals to and from the AV 102 and the client computing device 170. These signals can include reporting data for training and evaluating machine learning algorithms, roadside assistance requests, software updates, ridesharing pick-up and drop-off instructions, and so forth. In this example, the data center 150 includes an analysis stack 152, a user interface 154, a remote assistance stack 156, a ridesharing service stack 158, and a data management stack 160, among other stacks and systems.

The analysis stack 152 can receive data from the AV 102 and/or the client computing device 170, and analyze the data to train or evaluate machine learning algorithms for operating the AV 102. The analysis stack 152 can also perform analysis pertaining to data associated with one or more errors or constraints reported by the AV 102 and/or the client computing device 170.

The user interface 154 can present metrics, video, pictures, sounds, and so forth that are reported from the AV 102 and/or the client computing device 170 to a human operator of the data center 150. The user interface 154 can further receive input instructions from a human operator that can be sent to the AV 102 and/or the client computing device 170.

The remote assistance stack 156 can generate and transmit instructions regarding the operation of the AV 102. For example, in response to an output of the analysis stack 152 or the user interface 154, the remote assistance stack 156 can prepare instructions for one or more stacks or systems of the AV 102.

The ridesharing service stack 158 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smart watch, smart eyeglasses or other Head-Mounted Display (HMD), smart ear pods or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing system 110). The ridesharing service stack 158 can receive requests to be picked up or dropped off from the ridesharing application 172 and dispatch the AV 102 for the trip.

The data management stack 160 can be a "big data" system capable of storing large volumes of data (e.g., terabytes, petabytes, or more of data), receiving and transmitting data at high velocities (e.g., near real-time or real-time), and processing a large variety of data, such as data having different structure (e.g., structured, semi-structured, unstructured, etc.), data of different types (e.g., sensor data, mechanical system data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various stacks and systems of the data center 150 can access data stored by the data management stack 160 to provide their respective services.

In some embodiments, the real-time streaming stack 120 and/or the data management stack 160 can include a stream processing engine, such as Apache™ Spark®, Apache™ Storm®, Apache™ Samza®, Apache™ Flink®, Apache™ Apex®, and Apache™ Flume®, and the like. In general, a stream processing engine can comprise a library and run-time engine that enable users to supply code or other logic to process streaming data without having to deal with the underlying complexity of resource negotiation, traffic management, and so forth. The stream processing engine typically models the processing pipeline, the set of functions through which data flows, as a Directed Acyclic Graph (DAG) that the data traverses in a specific order with each node representing a distinct function but capable of being chained together.

Spark® is a distributed general-purpose cluster computing framework that relies on in-memory data processing. Spark® is based on the concept of Resilient Distributed Datasets (RDDs). RDDs are distributed immutable tables of data, which can be split up and allocated to worker nodes. Executors on the worker nodes perform processing on their own piece of the data, which a cluster manager can combine to generate a complete result. As RDDs are immutable, the worker nodes cannot make alterations; they simply process information and output results.

Apache™ Storm® is based on the concepts of "spouts" and "bolts." Spouts are sources of information and transfer information to one or more bolts. This information can be linked to other bolts, and the entire topology forms a DAG. Developers can define how the spouts and bolts are connected.

Samza® uses a publish/subscribe task model in which a task listens in on a particular data stream, processes messages upon arrival to the stream, and outputs the processing results to one or more subscribing streams. Samza® can divide a stream into multiple partitions and provision a replica of the task for every partition. Apache™ Samza® relies on other platforms to handle certain tasks, such as Apache™ Kafka® for the streaming of data between tasks and Apache™ Hadoop® Yet Another Resource Negotiator (YARN) for resource management and job scheduling.

Kafka® utilizes the concepts of producers that publish a stream of records or messages to one or more Kafka® topics or channels, consumers that subscribe to one or more topics and process the messages produced to them, stream processors that consume an input stream from one or more topics and produce an output stream to one or more output topics (i.e., transforming input streams to output streams), and connectors that provide interoperability between producers and consumers and existing data systems.

YARN is a clustering framework that separates resource management and job scheduling/monitoring into discrete functionalities. A YARN cluster includes a global resource manager node and node managers for other nodes of the cluster. YARN also deploys a separate application master for each application, which can be a single job or a DAG of jobs. The resource manager arbitrates resources among the applications in the cluster, and the node manager operates as the per-machine agent responsible for monitoring and managing containers and their usage of computing resources. The resource manager includes a scheduler and an applications manager. The scheduler allocates resources to the applications according to policy, and the applications manager handles job submissions jobs, including requesting the first container for executing the application-specific application master and restarting the application master container upon failure. Each application master is responsible for requesting additional containers from the scheduler and managing the containers.

Samza® tasks consume streams of data from Kafka®, which are partitioned and executed in parallel in YARN containers has a callback-based process message API. Samza® depends on YARN for fault tolerance, and can migrate tasks to another machine if a machine in the cluster fails. Samza® can process messages in the order they are written and ensure that no message is lost.

Flink® is based on the concept of streams and transformations. Data comes into the system via a source and leaves via a sink. To produce a Flink® job, Apache™ Maven® is used to create a skeleton project including dependencies and packaging requirements to enable developers to immediately add custom code without this overhead. Flink® also uses a declarative engine, and the DAG is implicitly defined by the ordering of the transformations. If Flink® determines that a particular transformation does not depend on the output from another transformation, then Flink® can rearrange the transformations to increase parallelism.

Apex® provides a stream and batch processing platform based on Hadoop® and a framework for building distributed applications. Apex® utilizes Hadoop® Distributed Filing System (HDFS™) for persisting state and YARN for scheduling, resource management, jobs, security, multi-tenancy, and fault-tolerance, and so forth.

Flume® is a Complex Event Processor for processing large amounts of log data, network traffic data, social network data, email, and the like. A Flume® event is defined as a unit of data flow having a byte payload and an optional set of string attributes. A Flume® agent is a process that hosts the components through which events flow from an external source to the next destination (hop). A Flume® source consumes events delivered to it by an external source, such as a web server. The external source sends events to Flume®, which stores it into one or more channels. The channel is a passive store that keeps the event until it is consumed by a Flume® sink, which removes the event from the channel and puts it into an external repository, such as HDFS™, or forwards it to the Flume® source of the next Flume agent (next hop) in the flow. The source and sink within the Flume® agent can run asynchronously with the events staged in the channel.

Figure 2:
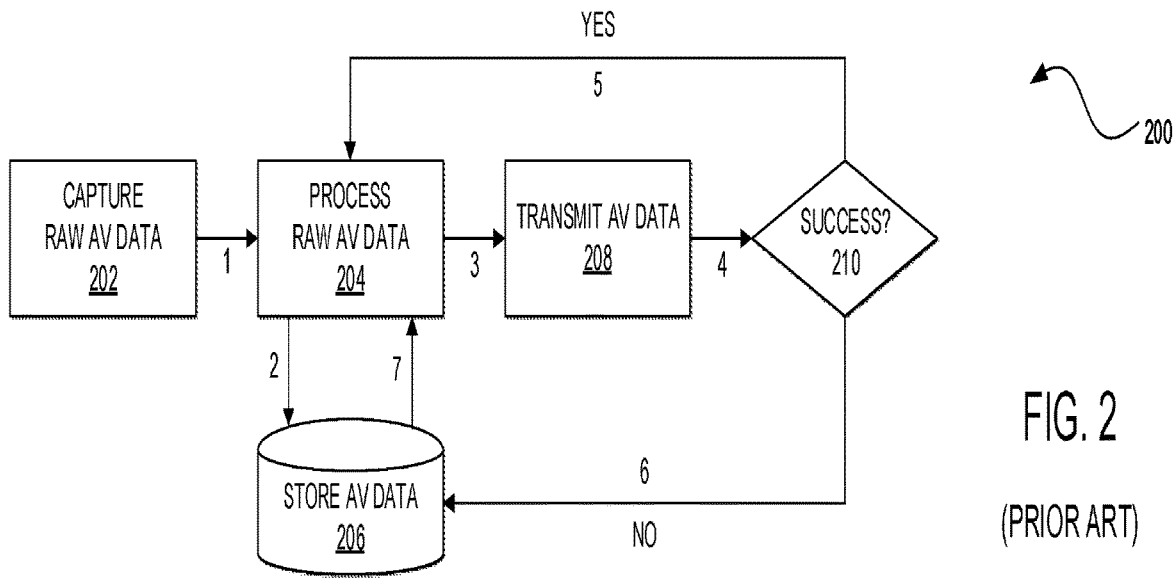
FIG. 2 illustrates an example of a method for transmitting AV data performed by a conventional AV.

FIG. 2 illustrates an example of a method 200 for transmitting AV data performed by a conventional AV. One of ordinary skill will understood that, for any method discussed herein, there can be additional, fewer, or alternative steps performed in similar or alternative orders, or in parallel, within the scope of the various embodiments unless otherwise stated. The method 200 can begin with step 202 in which raw AV data is captured by the conventional AV. For example, the conventional AV may include a GPS receiver that can detect microwave signals from four or more satellites in Earth's orbit. The GPS signals can include ranging codes that may be used to measure the distance to each satellite and navigation messages. The navigation messages can include ephemeris data (e.g., satellite health and exact position data for each satellite) and almanac data (e.g., orbit and status information for all of the satellites of the system). The satellites can modulate the ranging codes and navigation messages onto a carrier wave to broadcast to the GPS receiver. The GPS receiver can process the satellite signals to obtain the ranging codes and navigation messages, perform trilateration to determine position, velocity, time, and so forth, and output this information via a serial interface in a specific format (e.g., National Marine Electronics Association (NMEA)), baud rate (e.g., signal units transmitted per second), and update rate (e.g., how often the GPS receiver calculates and reports a data point). For example, the GPS receiver may output ASCII, including longitude, latitude, altitude, time, and so forth as one data point.

After capturing raw AV data, the method 200 can proceed to step 202 in which the conventional AV processes the raw AV data to generate AV data in a format to store in memory, a database, a file, and the like, and to transmit across a network connection. In particular, the method 200 may continue to step 206 in which the conventional AV can locally store the AV data generated at step 204. The local storage can be any type of data store (e.g., relational database, object-oriented database, key-value database, wide column database, graph database, time series database, file system, etc.), utilize any storage medium (e.g., hard disk drive (HDD), solid state drive (SSD), or other suitable type of storage media), and employ any type of serialization (e.g., block storage, object storage, file storage, etc.). However, storage can be a relatively scarce resource, and the conventional AV may have no way of determining what AV data may be critical to retain and what AV data can be overwritten.

At step 208, the conventional AV can attempt to upload the processed AV data to the remote computing system. The remote computing system can be a part of any type of network (e.g., private cloud, public cloud, hybrid cloud, multi-cloud, etc.), and transmission can occur over any wired or wireless network protocol (e.g., HTTP, HTTPS, Websocket, Real-time Protocol (RTP), Real-Time Transmission Control Protocol (RTCP), Real-time Streaming Protocol (RTSP), Transmission Control Protocol (TCP), User Datagram Protocol (UDP), etc.) or other wired or wireless communication standard (e.g., Wi-Fi, Long-Term Evolution (LTE), Global System for Mobile Communications (GSM), Peripheral Connection Interface Express® (PCIe), Non-Volatile Memory Express (NVMe), USB, etc.).

At a decision block 210, the conventional AV can determine whether the AV data was successfully uploaded. If transmission was successful, the conventional AV may continue to step 204 to process additional raw AV data. If transmission was not successful, the conventional AV may log the transmission failure to the local storage at step 206. Using this approach, there will be gaps in the streaming AV data that can be highly consequential in the operation of the AV.

Figure 3:
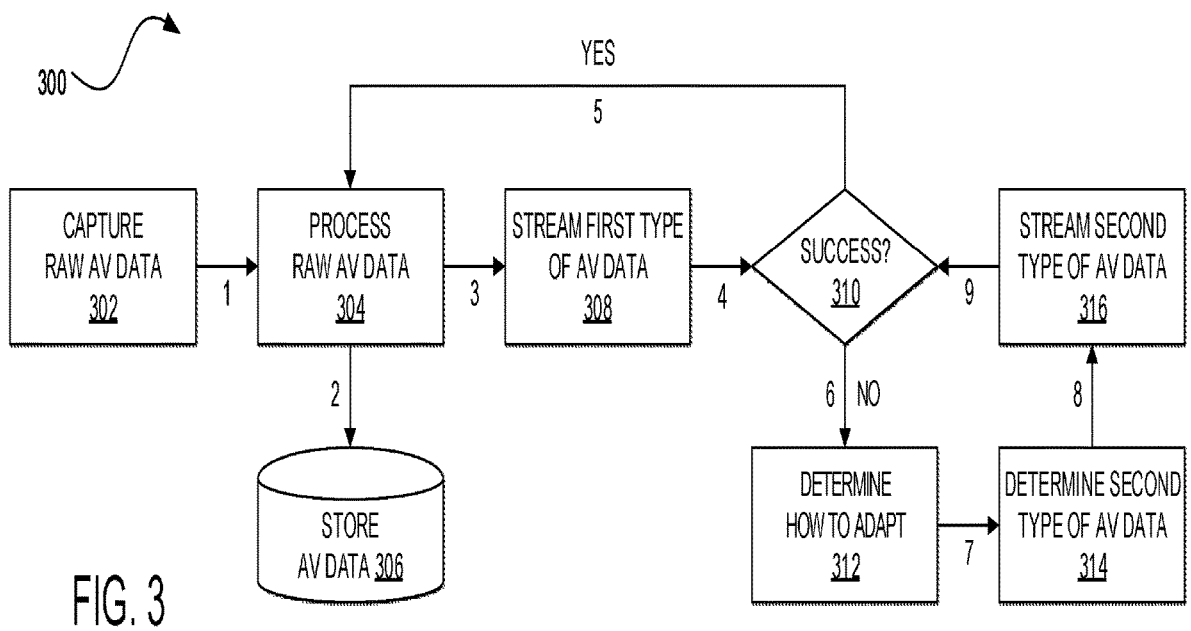
FIG. 3 illustrates an example of a method for real-time adaptive streaming of AV data performed by an AV in accordance with an embodiment.

FIG. 3 illustrates an example of a method 300 that can be performed by an AV, such as the AV 102, adaptively stream AV data to a remote computing system, such as the data center 150, in real-time. The method 300 can be performed at least in part by AV 102 and/or the data center 150. The method 300 may begin at step 302 in which the AV 102 can capture raw AV data from its sensor systems 104, 106, 108, the mechanical systems 130, 132, 134, 136, and 138, and other instruments. Many AV instruments may not be capable of directly connecting to a Wide Area Network (WAN) (e.g., the Internet, a public cloud, a private enterprise network, etc.). The AV instruments may instead connect to the WAN through their hosts' wired or wireless communication interfaces (e.g., PCIe, Inter-Integrated Circuit (I2C), Institute of Electric and Electronic Engineers (IEEE) 802.x, Ethernet, USB, Recommended Standard (RS) 232, Bluetooth®, and other Open Systems Interconnect (OSI) Layer 1 (physical layer) or Layer 2 (data link layer) protocols).

In view of the heterogeneity of AV instruments, such as due to the differences in their functionalities and capabilities, communication interfaces, computing resources (e.g., processing, memory, storage, etc.), and so forth, many of the instruments do not implement a standard protocol. For example, AV instruments may require different communication port configurations, instrument commands, and metadata that describe the instruments and the measurements they produce. Most AV instruments may be incapable of supplying this information automatically and can require configuration of the instrument host beforehand. Part of configuration can involve installation of instrument-specific driver software on the host, and it may be the driver software that actually handles interaction with the instrument. In addition, files that describe the characteristics of the AV instrument may also require installation. Most systems require careful manual installation and configuration by technicians to assure that the software components are properly associated with the physical instruments that they represent. In some cases, these manual steps must be performed in environments that are physiologically and psychologically challenging (e.g., bad weather, vehicular emergency, network failure, etc.), thus increasing the possibility of human error.

In some embodiments, the AV 102 can implement standards, specifications, protocols, Application Programming Interfaces (APIs), and other approaches for providing interoperability between AV instruments and the local computing system 110, such as developed by the Open Geospatial Consortium (OGC®) (e.g., Sensor Web Enablement (SWE), Observations and Measurements (O&M), Sensor Model Language (SensorML), Sensor Observation Service (SOS), Sensor Planning Service (SPS), PUCK, SensorThings API, etc.), IEEE (e.g., IEEE 1451.x), World Wide Web Consortium (W3C®) (e.g., Semantic Sensor Network (SSN) ontology, Web Ontology Language (OWL) 2, Generic Sensor API, Web Thing Model, etc.), the Internet Engineering Task Force (IETF®) (e.g., Request For Comments (RFC) 8520 Manufacturer Usage Description (MUD) specification), Mozilla® (e.g., Web Thing Restful State Transfer (REST) API, Web Thing WebSocket API, etc.) the Open Connectivity Foundation™ (OCF) (e.g., IOTivity), and so on.

At a high level, these mechanisms for interoperability provide information for discovery of an instrument and its capabilities and, in some cases, configuration of the physical operation of the instrument, such as how the instrument captures and outputs its data (e.g., radio frequency, sampling rate, bitrate or baud rate, field of view, etc.). This information can come in the form of datasheet metadata, such as standardized in the OGC® SWE SensorML, IEEE 1451 Transducer Electronic Datasheet (TED), IETF® MUD specification, and the like, as well as instrument driver code. The datasheet metadata can include a universally unique identifier (UUID) and manufacturer and model codes. The metadata can also include pointers to more extensive instrument information. For example, additional instrument documents may be stored in a separate network-accessible database that is keyed to the UUID and/or the datasheet metadata can include a Uniform Resource Identifier (URI) to the additional instrument information. In the case of driver code, it will be appreciated that the code is not executed on the instrument itself but can be retrieved and executed by the instrument host (e.g., the local computing system 110).

In some embodiments, the AV 102 can access its instruments through their drivers, which can run on the local computing system 110 and invoke appropriate instrument protocol commands, such as to read from the instrument's memory, write to its memory, and so forth. In some cases, the driver can also transform the instrument's output to a standard format. That is, the local computing system 110 can use the driver to transform the AV instruments' raw data to a specified format. Thus, in addition to capturing raw AV data at step 302, in some embodiments, the AV 102 can also specify the type, format, quality, quantity, frequency, and other parameters of how its instruments capture and output their raw data. This can be advantageous under certain contexts, such as during a low battery state or other impairment of the AV 102.

At step 304, the AV 102 can process the raw AV data to generate a first type of AV data. The raw data can include analog data or digital data in an intermediate format that can be serialized and receive by the local computing system 110 of the AV 102. The processing of the raw AV data can improve the quality of the AV data (e.g., ensure the data is valid, accurate, complete, consistent, uniform, etc.), make it easier for consumption (e.g., adhere to a database schema, convert from little endian to big endian, etc.), or otherwise prepare the AV data for storage, streaming, and other downstream processing. Some examples of the processing that can occur include data enrichment (e.g., annotating data points with additional information), missing value processing (e.g., ignoring data points having missing values, substituting missing values with dummy values, mean, mode, median, etc.), de-duplication (e.g., deleting or aggregating duplicate or redundant or insignificant data points), outlier or noise processing (e.g., binning, regression, deleting outliers or noise, etc.), generalization (e.g., converting specific data points to less specific data points, such as mapping specific GPS coordinates to a city, state, country, etc.), rescaling (e.g., normalization, standardization, min-max scaling, etc.), aggregation (e.g., summarizing or consolidating data, such as combining multiple instances of data points detected every second for ten minutes into a single instance representing a ten-minute span), discretization (e.g., converting continuous values to discrete values, binning, binarization, etc.), non-linear transformations (e.g., mapping data values to a uniform distribution, Gaussian distribution, etc.), compression or decompression, encryption or decryption, and so forth.

At step 306, the AV 102 can store the first type of AV data to local storage. Then, at step 308, the AV 102 can attempt to stream the first type of AV data to the data center 150 in real-time using any suitable wired or wireless communication protocol. For example, the AV 102 may attempt to transmit the first type of AV data within a real-time stream in response to a request from the data center 150. The request can implicitly or explicitly include adaptation information indicating how to adapt to a current context, such as one or more streaming conditions that trigger adaptive streaming, information for adapting the first type of AV data, and/or information generating a second type of AV data to stream within the real-time stream. The adaptation information can be directly included in the request (e.g., via an HTTP/REST POST command) and/or indirectly included programmatically using getters and setters before initiating streaming (e.g., via a Software Development Kit (SDK) for a programming language such as C, Go, Java®, JavaScript®, Node.js, PHP, Python, Ruby, etc.). In some embodiments, streaming can occur above Layer 4 (transport layer) of the OSI model (i.e., Layer 5 (session layer), Layer 6 (presentation layer), or Layer 7 (application layer). For example, the real-time streaming stack 120 may utilize HTTP/2, Web Socket (IETF® RFC 6455), Web Real-Time Communications (WebRTC), or HTTP long polling to stream the first type (and/or second type) of AV data. In some embodiments, the AV 102 can utilize a single connection with the data center 150 to transmit the AV data but different channels for different AV instruments, such as by annotating the first type of AV data or routing it to a particular channel (e.g., a Kafka® topic). In other embodiments, the AV 102 can multiplex the first type of AV data from different instruments, and the data center 150 can de-multiplex the AV data based on an exchange of multiplexing/de-multiplexing information.

The method 300 can continue to decision block 310 in which the AV 102 can determine whether it successfully streamed the first type of AV data. If the AV 102 determines that the first type of AV data was successfully streamed, the AV 102 can return to a next iteration of step 304 and continue processing raw AV data. In some embodiments, the AV 102 may also erase the first type of AV data stored locally at the current iteration of step 306 or enable the first type of AV data to be overwritten from local storage. For example, the AV 102 can store a reference in local storage (e.g., a database column flag, file or directory metadata, event or messaging queue, log, etc.) indicating whether it is safe to erase the first type of AV data from local storage. When the first type of AV data successfully streams to the data center 150, the AV 102 can mark it as safe to erase or overwrite.

As one of ordinary skill in the art will appreciate, success may be defined in different ways. In some cases, success can be determined by the data center 150 receiving the first type of AV data within a specified time. In other cases, success can be dictated by a level of accuracy of the first type of AV data. In still other cases, success may be defined by a cost model based on the value of streaming the first type of AV data to the data center 150 in real-time relative to the value of the data center 150 receiving the first type of AV data at a later time. A combination of these and other approaches may also be used.

If streaming of the first type of AV data is determined to be unsuccessful, such as due to processing, network bandwidth, or other constraints, the method 300 can advance to step 312 and the AV 102 can determine how to adapt streaming to the current circumstances. For example, the AV 102 may refer to the adaptation information implicitly or explicitly included in the request received at step 308. As discussed, the adaptation information can indicate how to adapt the first type of AV data and/or how to generate the second type of AV data to stream in place of the first type of AV data.

At step 314, the AV 102 can adapt the first type of data by further processing it to generate the second type of data. In other embodiments, the AV 102 can process first raw AV data from a first instrument to generate the first type of AV data, and process second raw data from a second instrument to generate the second type of AV data. Using either approach, at a next iteration of step 304, the AV 102 can concurrently operate on additional raw AV data to generate the first type of AV data and the second type of AV data. In other cases, the AV 102 can generate the first type of AV data and the second type of AV data sequentially. Various other combinations are also possible as discussed throughout the present disclosure.

The method 300 may continue to step 316 to stream the second type of AV data to the data center 150 using the same real-time stream as in step 308 and return to a next iteration of decision block 310. If streaming the second type of AV data is once again unsuccessful, the AV 102 may repeat the loop of steps 312, 314, and 316 with other adaptations. If streaming the second type of AV data is successful, the method 300 may continue to the next iteration of step 304.

In some embodiments, the AV 102 can explicitly signal the data center 150 that the conditions for adaptive streaming are no longer satisfied, such as by embedding an identifier, marking, header, and the like within the real-time stream and/or communicating with the data center 150 through a separate communication channel (e.g., a prioritized message). The signal can indicate to the data center 150 that the second type of AV data represents an adaptation of the first type of AV data, and the data center 150 can process the second type of AV data based on the previous exchange of the adaption information between the data center 150 and the AV 102 occurring at step 308. In other embodiments, the data center 150 may be implicitly aware of the adaptation upon receiving the second type of AV data. For example, if the data center 150 expects to receive a first type of data, such as LIDAR data, for hyper-localization of the AV 102 but instead receives a second type of AV data, such as GPS path coordinates, the data center 150 is still capable of localizing the AV 102 with a high degree of accuracy. The previous exchange of the adaptation information between the AV 102 and the data center 150 can provide for such dynamism and enhances the robustness of real-time streaming.

In response to determining the AV 102 is capable of streaming the first type of AV data once again (e.g., the previous constraints due to processing, network bandwidth, and so forth, are no longer present), the AV 102 may return to real-time streaming of the first type of AV data. The AV 102 may explicitly signal the date center 150 this change to its context within the real-time stream itself or through a separate communication channel. Alternatively, the data center 150 may be implicitly aware of the change based on the contents of the real-time stream. Because the AV 102 is free of the streaming conditions imposed upon it, the AV may also backfill the first type of AV data that was collected during the time period in which the AV 102 adaptively streamed the second type of AV data. In some embodiments, the AV 102 can transmit the first type of data from this time period, and the data center 150 can replace the second type of AV data with the first type of AV data. In other embodiments, the data center 150 can append the first type of AV data to a data repository for the real-time stream. In these examples, the data center 150 may perform a comparison between the backfilled first type of AV data and the second type of AV data to determine their relative accuracy levels, and optimize future adaptations and use of the second type of AV data. Various other comparative analytics can also be performed.

Figure 4:
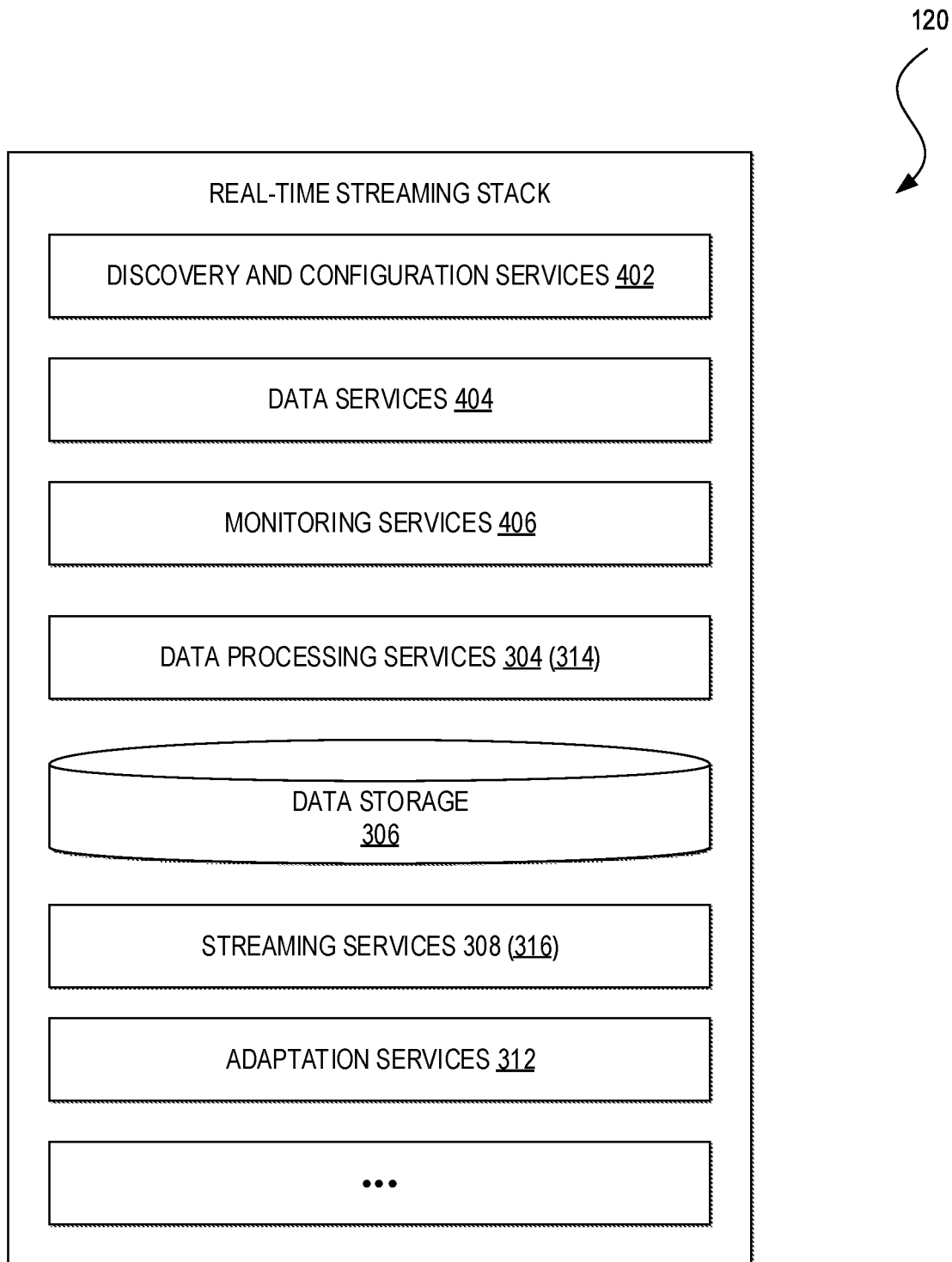
FIG. 4 illustrates an example of an real-time adaptive streaming data stack for an AV in accordance with an embodiment.

FIG. 4 illustrates an example of the real-time streaming stack 120. The real-time streaming stack 120 can include discovery and configuration services 402, data services 404, monitoring services 406, data processing services for performing the functionality of steps 304 and 314, data storage for performing the functionality of step 306, streaming services for performing the functionality of steps 308 and 316, and adaptation services for performing the functionality of step 314, among other services and systems.

The discovery and configuration service 402 can enable a client to learn about the services of the real-time streaming stack 120, the AV 102, and its instruments, and their respective capabilities. From the discovery and configuration services 402, the client can obtain metadata about the services, the AV 102, or its instruments; parameterization options available for the services, AV 102, or its instruments; and verification that the services, AV 102, or its instruments are capable of performing a particular action. In addition, the discovery and configuration services 402 can allow the client to request the AV 102 or its instruments to perform actions based on their capabilities, retrieve the status of requests, update requests, obtain information about access to the data collected by the AV 102 or its instruments (in the aggregate and on a per request basis), cancel requests, provision and manage metadata of the services, the AV 102, or its instruments, publish to and subscribe for information or events generated by the services, the AV 102, or its instruments (e.g., to notify the clients of any new information regarding their requests, the services, the AV 102, or its instruments. Examples of interfaces of the discovery and configuration services 402 include the OGC® SPS and SensorThings API, W3C® Generic Sensor API and Web Thing Model, and the Mozilla® Web Thing REST API, Web Thing Websocket API, among others.

The data services 404 can provide interoperability between different instrument data systems via a standardized interface for retrieving metadata and measurements from the data services, the AV 102, and its instruments. From the data services 404, a client can obtain access to measurements made by the data services, the AV 102, or its instruments, filter the AV data by space, time, instrument, location, and other dimensions, retrieve features of interest, insert measurements, delete measurements, update measurements, and so forth. Examples of interfaces for the data services 404 include the OGC® O&M and SOS.

The monitoring services 406 can continuously track the state of the AV 102 or its environment. The AV 102 can use the monitoring services 406 to determine whether certain streaming conditions are satisfied. In some embodiments, the monitoring services 406 can also notify the AV 102 when streaming conditions are no longer satisfied or whether other conditions are satisfied. For example, the monitoring services 406 can alert the AV 102 when network conditions improve and the AV can return to real-time streaming of the first type of AV data and backfilling it. In some situations, the AV 102 can incrementally adapt to streaming conditions. For instance, the AV 102 may the loop of steps 312, 314, and 316 several times with a different adaptation each time when network conditions have deteriorated. As network conditions improve, the AV 102 may perform the loop of steps 304, 306, and 308 by incrementally reverting each adaptation performed in the loop of steps 312, 314, and 316.

Figure 5:
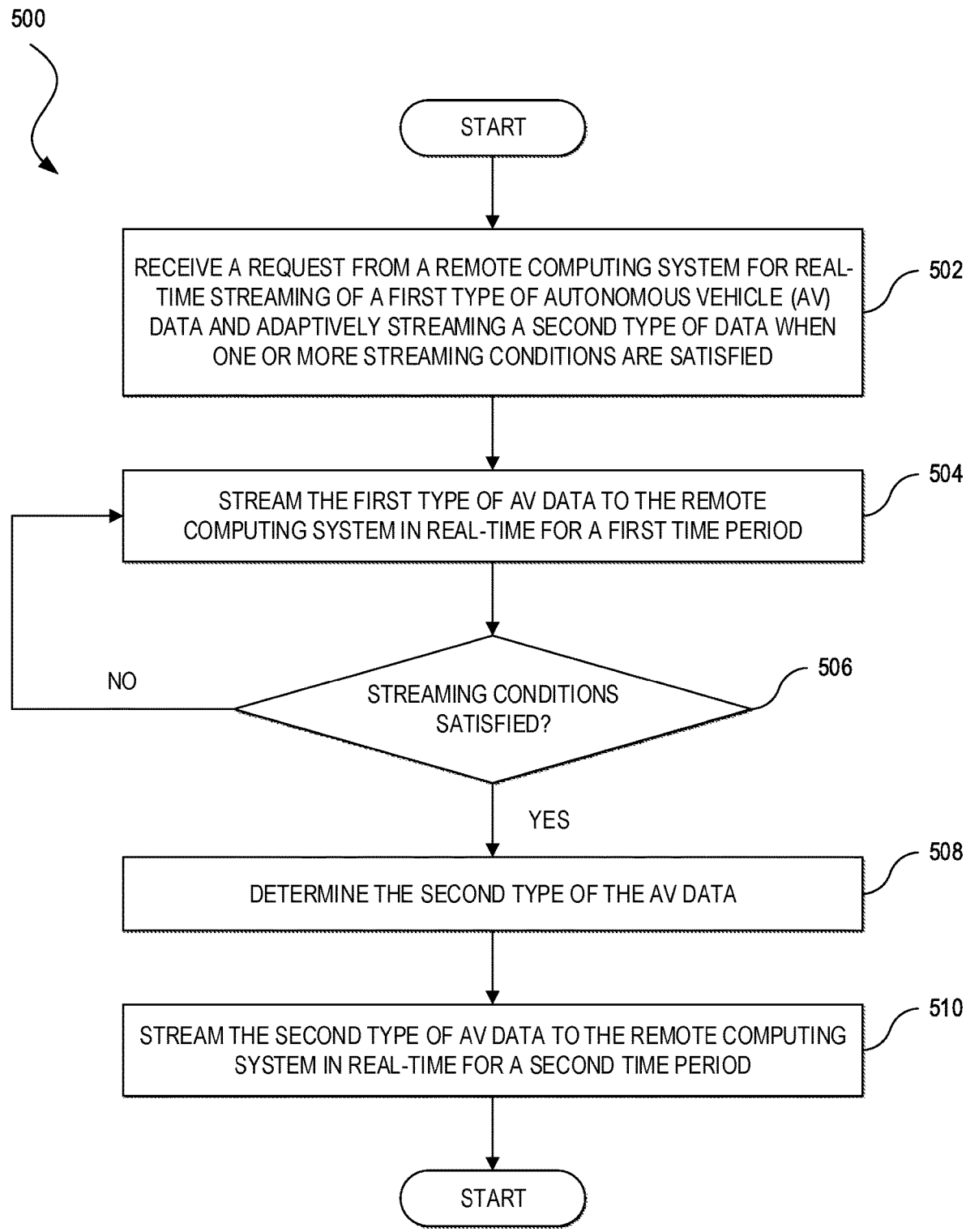
FIG. 5 illustrates an example of a method for real-time adaptive streaming of AV data in accordance with an embodiment.

FIG. 5 illustrates an example of a method 500 for real-time adaptive streaming of AV data. The method 500 can be initiated at step 502 in which the AV 102 may receive a request from a remote computing system (e.g., the data center 150, a third party developer, or other entity authorized to access the AV's) for real-time streaming of a first type of AV data and adaptively streaming of a second type of AV data when one or more streaming condition are satisfied. The request can implicitly or explicitly include adaptation information, such as how to adapt the first type of AV data and/or generate the second type of AV data and/or the streaming conditions that trigger adaptive streaming. In some embodiments, an interface, such as a REST API, an SDK, a data policy engine, and so forth, can be provided for enabling AV data consumers to request for real-time streaming of the first type of AV data, adapting the first type of AV data and/or generating the second type of AV data, and/or setting the streaming conditions for adaptive streaming.

REST is a design pattern in which a server enables a client to access and interact with resources via URIs using a set of predefined stateless operations (referred to as endpoints), such as GET (e.g., retrieve resource representation or information), POST (e.g., to create new resources), PUT (e.g., update an existing resource), DELETE (e.g., delete a resource), and so forth, and/or other higher-order operations extending these basic REST/HTTP endpoints. The REST interface can utilize an object model for representing an AV, its instruments, and their measurements, among other entities.

In some embodiments, the services and systems of the real-time streaming stack 120 can present a service model or REST interface to enable interaction between the real-time streaming stack 120 and a remote user, such as an application developer, network administrator, technician or other user of the data center 150, or a third party developer or other user authorized to access the stack's streaming AV data. For example, the user may interact with the discovery and configuration services 402 to learn about the services of the real-time streaming stack 120, the AV 102, the AV's instrument and their capabilities. In some cases, the user may also be capable of configuring the physical operation of the AV 102 and its instruments via the discovery and configuration services 402. The user can also interact with the monitoring services 406 to set the streaming conditions, and the data services 404, the data processing services 304 (314), the streaming services 308 (316), and/or the adaptation services 312 to request for real-time streaming of the first AV data and adaptively streaming the second type of AV data when the streaming conditions are satisfied.

At step 504, the AV 102 can stream the first type of AV data to the remote computing system within a first time period. Then, at decision block 506, the AV 102 can determine whether the one or more streaming conditions are satisfied. In some embodiments, a data policy engine can be provided enable a user to define data policies that set the streaming conditions and the actions for the AV to perform when the conditions are satisfied (or not satisfied). For example, a data policy for real-time streaming of a first type of AV data, such as video from a camera in the cabin of the AV 102, when there are no passengers, and to adapt to real-time streaming of a second type of AV data, such as seat occupancy sensor data, when there are passengers for privacy purposes. As another example, a data policy can be defined for real-time streaming of a first type of data, such as voice data captured by one or more microphones of the AV 102, for passengers interacting with the AV 102 by voice and a second type of sensor data, such as capacitive sensor data, for passengers interacting with the AV 102 by touchscreens inside the AV. Numerous other data policies can also be defined from other examples discussed throughout the present disclosure.

If the streaming conditions are not satisfied, the method 500 can return to step 504 and continue streaming the first type of AV data to the remote computing system. However, if the AV 102 determines at decision block 506 that the streaming conditions are satisfied, the method 500 may continue to step 508 in which the AV 102 can determine the second type of AV data, and at step 510, stream the second type of AV data to the remote computing system. In some embodiments, an SDK can be provided for greater programmatic control over real-time streaming of AV data. For example, the SDK can implement a processing pipeline programming model that abstracts the processing of streaming AV data as one or more DAGs. Each node can represent a distinct set of operators that can be chained together to perform a sequence of operations on the streaming data. The programming model can include built-in operators as well as support user-defined functions for adaptively streaming AV data. Examples of operators include primitive operators, such as such as arithmetic, Boolean, conditional (e.g., less than, greater than, equal, etc.), statistical (e.g., median, mean, mode, minimum, maximum, standard deviation, etc.), array, set (e.g., union, intersection, difference, etc.), string, date, typecast operators (e.g., converting from one type of data to another, such from as an integer to a float value or a string to a character array), and functional operators (e.g., map, reduce, filter, etc.), as well as higher-order operators incorporating multiple primitive operators. Users can specify paths for how AV data traverses the DAG depending on an AV context, such as a state of the AV 102 or its environment.

In one example, the AV 102 can include a speed sensor capable of capturing a first type of AV data, such as the instantaneous speed of the AV at a rate of one thousand times per second. When the AV 102 is in a high bandwidth environment, the AV 102 can stream all of these data points in real-time or near real-time. However, when bandwidth is limited, the AV 102 can instead provide a second type of AV data, such as a rolling average of 20 data points per second from the same speed sensor or another speed sensor (or other instrument), to obtain lower bandwidth but relevant information. As another example, the AV 102 can include a video camera configured to record video at 1920×1080 resolution and 30 frames per second (fps). Unlike conventional HTTP real-time streaming, which limits selection of streaming media to a small set of encodings generated by the media server, a consumer of the video recorded by the AV 102 can request for LIDAR point cloud data as an alternative to the video data under different scenarios. In some embodiments, the AV data from different types of instruments may be encoded in their respective native formats for real-time streaming. In other embodiments, the AV 102 may instead encode the second type of AV data in the native format of the first type of AV data, and the remote user can decode the data from the real-time stream to recover the second type of AV data.

The SDK can also provide programmatic control over the sequence of adaptations. In one example, priority can be configured implicitly based on the order of the operators used to define the DAG. In other embodiments, prioritization can be supported more explicitly, such as by requiring the user to pass in a variable or to declare the priority of each streaming operator.

The SDK can also enable remote users to combine data captured from multiple AV instruments to improve accuracy of AV data captured from any one instrument in a process sometimes referred to as sensor fusion. Sensor fusion can be used to aggregate data captured by multiple sensors or instruments, such as multiple cameras, inertial sensors, infrared transceivers, GPS, microphones, and so forth, to obtain information of a state of the AV or its environment that may be more accurate and/or complete than would be possible from a single sensor alone. For example, conventional cameras may be limited to capturing two-dimensional images of scenes. However, images captured by multiple cameras with different fields of view can be used to analyze a scene in three dimensions. This could be a possible alternative to receiving LIDAR point data in certain situations. As another example, a conventional three-axis accelerometer may be limited to measuring linear acceleration along three dimensions (e.g., x-, y-, and z-axis) while a three-axis gyroscope may be limited to measuring rotational acceleration along three dimensions (e.g., roll, pitch, and yaw). By implementing sensor fusion, the sensor data captured by the accelerometer and the gyroscope can be used to derive motion according to six dimensions or six degrees of freedom (6DOF) when there is a GPS fault. Some well-known sensor fusion techniques include maximum likelihood estimation (MLE) approach, Kalman filtering, extended Kalman filtering, unscented Kalman filtering, particle filtering, among others.

Further, the programmability of the context in which to stream AV data can provide a variety of other adaptations. For example, in addition to network bandwidth, the user may evaluate other computing resources of the AV 102 (e.g., processing capacity, memory, storage) and/or the data center 150; other states of the AV 102 (e.g., geographic location, battery or fuel state, whether the AV has been involved in a collision or other mechanical state of the AV, etc.) or its instruments (e.g., faulty sensor or actuator, occluded sensor, etc.), the states of passengers or delivery items within the AV 102, and other physical environmental states (e.g., road traffic conditions, weather, time of day, noise, air quality, etc.).

Figure 6A:
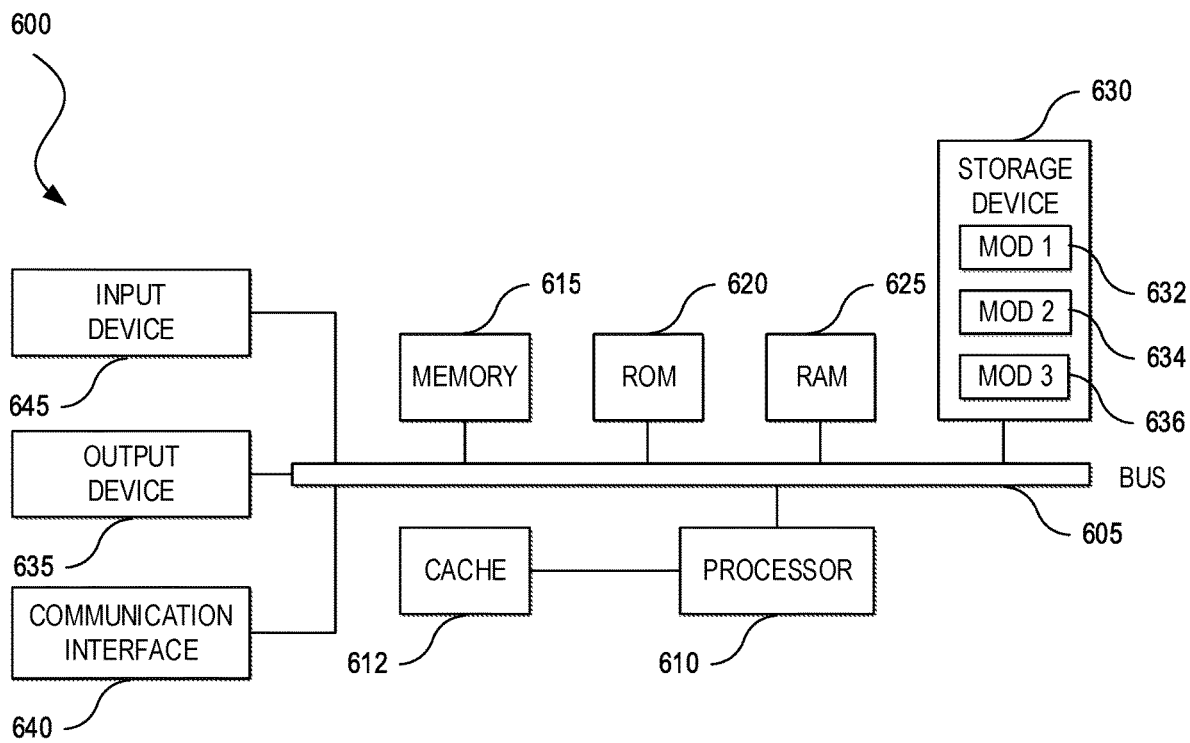
FIGS. 6A and 6B illustrate examples of computing systems in accordance with some embodiments.
Figure 6B:
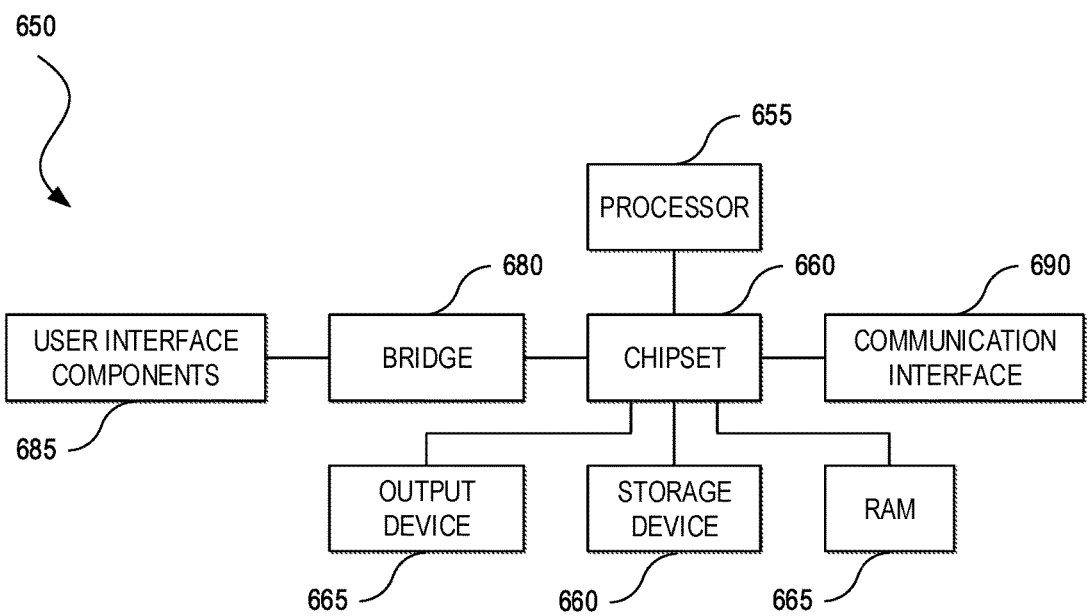

FIG. 6A and FIG. 6B illustrate systems in accordance with various embodiments. The more appropriate system will be apparent to those of ordinary skill in the art when practicing the various embodiments. Persons of ordinary skill in the art will also readily appreciate that other systems are possible.

FIG. 6A illustrates an example of a bus computing system 600 wherein the components of the system are in electrical communication with each other using a bus 605. The computing system 600 can include a processing unit (CPU or processor) 610 and a system bus 605 that may couple various system components including the system memory 615, such as read only memory (ROM) 620 and random access memory (RAM) 625, to the processor 610. The computing system 600 can include a cache 612 of high-speed memory connected directly with, in close proximity to, or integrated as part of the processor 610. The computing system 600 can copy data from the memory 615, ROM 620, RAM 625, and/or storage device 630 to the cache 612 for quick access by the processor 610. In this way, the cache 612 can provide a performance boost that avoids processor delays while waiting for data. These and other modules can control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in the storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing system 600, an input device 645 can represent any number of input mechanisms, such as a microphone for speech, a touch-protected screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing system 600. The communications interface 640 can govern and manage the user input and system output. There may be no restriction on operating on any particular hardware arrangement and therefore the basic features here may easily be substituted for improved hardware or firmware arrangements as they are developed.

The storage device 630 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 630 can include the software modules 632, 634, 636 for controlling the processor 610. Other hardware or software modules are contemplated. The storage device 630 can be connected to the system bus 605. In some embodiments, a hardware module that performs a particular function can include a software component stored in a computer-readable medium in connection with the necessary hardware components, such as the processor 610, bus 605, output device 635, and so forth, to carry out the function.

FIG. 6B illustrates an example architecture for a chipset computing system 650 that can be used in accordance with an embodiment. The computing system 650 can include a processor 655, representative of any number of physically and/or logically distinct resources capable of executing software, firmware, and hardware configured to perform identified computations. The processor 655 can communicate with a chipset 660 that can control input to and output from the processor 655. In this example, the chipset 660 can output information to an output device 665, such as a display, and can read and write information to storage device 670, which can include magnetic media, solid state media, and other suitable storage media. The chipset 660 can also read data from and write data to RAM 675. A bridge 680 for interfacing with a variety of user interface components 685 can be provided for interfacing with the chipset 660. The user interface components 685 can include a keyboard, a microphone, touch detection and processing circuitry, a pointing device, such as a mouse, and so on. Inputs to the computing system 650 can come from any of a variety of sources, machine generated and/or human generated.

The chipset 660 can also interface with one or more communication interfaces 690 that can have different physical interfaces. The communication interfaces 690 can include interfaces for wired and wireless Local Area Networks (LANs), for broadband wireless networks, as well as personal area networks. Some applications of the methods for generating, displaying, and using the technology disclosed herein can include receiving ordered datasets over the physical interface or be generated by the machine itself by the processor 655 analyzing data stored in the storage device 670 or the RAM 675. Further, the computing system 650 can receive inputs from a user via the user interface components 685 and execute appropriate functions, such as browsing functions by interpreting these inputs using the processor 655.

It will be appreciated that computing systems 600 and 650 can have more than one processor 610 and 655, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
   receiving, by an Autonomous Vehicle (AV) from a remote computing system, a request for real-time streaming of AV data, wherein the AV is capable of a primary streaming mode and at least one adaptive streaming mode;
   determining, by the AV, that one or more streaming conditions are satisfied that trigger the adaptive streaming mode; and
   streaming the AV data to the remote computing system in real-time using the adaptive streaming mode.

2. The computer-implemented method of claim 1, wherein the streaming conditions that trigger the adaptive streaming mode are sent with the request.

3. The computer-implemented method of claim 1, wherein the streaming conditions are established in accordance with an SDK that defines logic for configuring the streaming of the AV data on the AV using the adaptive streaming mode.

4. The computer-implemented method of claim 1, wherein the adaptive streaming mode includes data from at least one instrument of the AV that is different from an instrument used to stream data during the primary streaming mode.

5. The computer-implemented method of claim 1, further comprising:
pipelining first raw data through a first path of a directed acyclic graph to generate the AV data from the primary streaming mode; and
pipelining at least one of the first raw data or second raw data through a second path of the directed acyclic graph to generate the AV data from the at least one adaptive streaming mode.

6. The computer-implemented method of claim 1, wherein one or more data policies define the one or more streaming conditions, the computer-implemented method further comprising:
evaluating the one or more data policies to determine whether the one or more streaming conditions are satisfied.

7. The computer-implemented method of claim 1, wherein different streaming modes are used in different periods based on conditions changing.

8. A non-transitory computer-readable storage medium, the computer-readable storage medium comprising instructions that, when executed by a computer, cause the computer to:
receive, by an Autonomous Vehicle (AV) from a remote computing system, a request for real-time streaming of AV data, wherein the AV is capable of a primary streaming mode and at least one adaptive streaming mode;
determine, by the AV, that one or more streaming conditions are satisfied that trigger the adaptive streaming mode; and
streaming the AV data to the remote computing system in real-time using the adaptive streaming mode.

9. The computer-readable storage medium of claim 8, wherein the streaming conditions that trigger the adaptive streaming mode are sent with the request.

10. The computer-readable storage medium of claim 8, wherein the streaming conditions are established in accordance with an SDK that defines logic for configuring the streaming of the AV data on the AV using the adaptive streaming mode.

11. The computer-readable storage medium of claim 8, wherein the adaptive streaming mode includes data from at least one instrument of the AV that is different from an instrument used to stream data during the primary streaming mode.

12. The computer-readable storage medium of claim 8, wherein the instructions further configure the computer to:
pipeline first raw data through a first path of a directed acyclic graph to generate the AV data from the primary streaming mode; and
pipeline at least one of the first raw data or second raw data through a second path of the directed acyclic graph to generate the AV data from the at least one adaptive streaming mode.

13. The computer-readable storage medium of claim 8, wherein the one or more streaming conditions are defined by one or more data policies, wherein the instructions further configure the computer to:
evaluate the one or more data policies to determine whether the one or more streaming conditions are satisfied.

14. The computer-readable storage medium of claim 8, wherein different streaming modes are used in different periods based on conditions changing.

15. A computing system comprising:
a processor; and
a memory storing instructions that, when executed by the processor, configure the computing system to:
receive, by an Autonomous Vehicle (AV) from a remote computing system, a request for real-time streaming of AV data, wherein the AV is capable of a primary streaming mode and at least one adaptive streaming mode;
determine, by the AV, that one or more streaming conditions are satisfied that trigger the adaptive streaming mode; and
streaming the AV data to the remote computing system in real-time using the adaptive streaming mode.

16. The computing system of claim 15, wherein the streaming conditions that trigger the adaptive streaming mode are sent with the request.

17. The computing system of claim 15, wherein the streaming conditions are established in accordance with an SDK that defines logic for configuring the streaming of the AV data on the AV using the adaptive streaming mode.

18. The computing system of claim 15, wherein the adaptive streaming mode includes data from at least one instrument of the AV that is different from an instrument of the AV used to stream data during the primary streaming mode.

19. The computing system of claim 15, wherein the instructions further configure the computing system to:
pipeline first raw data through a first path of a directed acyclic graph to generate the AV data from the primary streaming mode; and
pipeline at least one of the first raw data or second raw data through a second path of the directed acyclic graph to generate the AV data from the at least one adaptive streaming mode.

20. The computing system of claim 15, wherein the one or more streaming conditions are defined by one or more data policies, wherein the instructions further configure the computing system to:
evaluate the one or more data policies to determine whether the one or more streaming conditions are satisfied.

* * * * *